United States Patent
Mestha et al.

(10) Patent No.: US 10,771,495 B2
(45) Date of Patent: Sep. 8, 2020

(54) CYBER-ATTACK DETECTION AND NEUTRALIZATION

(71) Applicant: General Electric Company, Schenectady, NY (US)

(72) Inventors: Lalit Keshav Mestha, North Colonie, NY (US); Olugbenga Anubi, Niskayuna, NY (US); Masoud Abbaszadeh, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 58 days.

(21) Appl. No.: 15/454,144

(22) Filed: Mar. 9, 2017

(65) Prior Publication Data

US 2018/0255091 A1    Sep. 6, 2018

Related U.S. Application Data

(63) Continuation-in-part of application No. 15/447,861, filed on Mar. 2, 2017, now abandoned.

(51) Int. Cl.
  *H04L 29/06*    (2006.01)
(52) U.S. Cl.
  CPC ...... *H04L 63/1441* (2013.01); *H04L 63/1416* (2013.01)
(58) Field of Classification Search
  CPC combination set(s) only.
  See application file for complete search history.

(56) References Cited

U.S. PATENT DOCUMENTS

| 8,544,087 B1* | 9/2013 | Eskin | G06F 21/552 726/22 |
| 2007/0226795 A1* | 9/2007 | Conti | G06F 21/554 726/22 |
| 2008/0134334 A1* | 6/2008 | Kim | H04L 63/1408 726/23 |

(Continued)

FOREIGN PATENT DOCUMENTS

| KR | 10-2013-0020265 A | 2/2013 |
| WO | 2016/022705 A1 | 2/2016 |

OTHER PUBLICATIONS

Zhang et al., "Against transient-steady effect attack using time check blocks," 2017 12th IEEE Conference on Industrial Electronics and Applications (ICIEA) Year: 2017 | Conference Paper | Publisher: IEEE.*

(Continued)

*Primary Examiner* — Roderick Tolentino
(74) *Attorney, Agent, or Firm* — Buckley, Maschoff & Talwaklar LLC (57) ABSTRACT

The example embodiments are directed to a system and method for neutralizing abnormal signals in a cyber-physical system. In one example, the method includes receiving input signals comprising time series data associated with an asset and transforming the input signals into feature values in a feature space, detecting one or more abnormal feature values in the feature space based on a predetermined normalcy boundary associated with the asset, and determining an estimated true value for each abnormal feature value, and performing an inverse transform of each estimated true value to generate neutralized signals comprising time series data and outputting the neutralized signals.

19 Claims, 6 Drawing Sheets

(56) References Cited

U.S. PATENT DOCUMENTS

| | | | |
|---|---|---|---|
| 2013/0031633 A1* | 1/2013 | Honig | G06F 21/554 726/23 |
| 2013/0198840 A1 | 8/2013 | Drissi et al. | |
| 2013/0198847 A1 | 8/2013 | Sampigethaya | |
| 2014/0082730 A1 | 3/2014 | Vashist et al. | |
| 2014/0130161 A1* | 5/2014 | Golovanov | G06F 21/564 726/23 |
| 2014/0298098 A1 | 10/2014 | Poghosyan et al. | |
| 2015/0205964 A1* | 7/2015 | Eytan | H04L 63/145 726/23 |
| 2015/0295943 A1 | 10/2015 | Malachi | |
| 2016/0057166 A1 | 2/2016 | Chesla | |
| 2016/0234242 A1 | 8/2016 | Knapp et al. | |
| 2016/0241581 A1 | 8/2016 | Waiters et al. | |
| 2016/0359899 A1 | 12/2016 | Zandani | |
| 2016/0378984 A1* | 12/2016 | Wojnowicz | G06F 21/565 726/23 |
| 2017/0147930 A1* | 5/2017 | Bellala | G06N 20/00 |
| 2018/0034658 A1* | 2/2018 | Kinage | H04L 12/40 |
| 2019/0011506 A1* | 1/2019 | Kobayashi | G01R 31/3648 |

OTHER PUBLICATIONS

Luo et al., "Real-time localization of mobile targets using abnormal wireless signals," 2017 IEEE International Conference on Consumer Electronics—Taiwan (ICCE-TW) Year: 2017 | Conference Paper | Publisher: IEEE.*

Jakobson, Gabriel "Mission-Centricity in Cyber Security: Architecting Cyber Attack Resilient Missions", 5th International Conference on Cyber Conflict (CyCon), Jun. 4-7, 2013, http://eeexplore.ieee.org/abstract/document/6568387/, 18pgs.

Tiwari, Ashish et al., "Safety Envelope for Security", In Proceedings of the 3rd International Conference on High Networked Systems, Apr. 2014, DOI: 10.1145/2566468.2566483, (pp. 85-94, 10 total pages).

Lerner, Lee W. et al., "Application-Level Autonomic Hardware to Predict and Pre-empt Software Attacks on Industrial Control Systems", 44th Annual IEEE/IFIP International Conference on Dependable Systems and Networks (DSN), Jun. 23-26, 2014, DOI: 10.1109/DSN.2014.26, http://eeexplore.ieee.org/abstract/document/6903574/, (pp. 136-147, 12 total pages).

Nazir, Sajid et al., "Cyber Attack Challenges and Resilience for Smart Grids", European Journal of Scientific Research, vol. 134, No. 1, Aug. 2015, ISSN: 1450-216X / 1450-202X, (pp. 111-120, 10 total pages).

Mishra, Shaunak et al., "Secure State Estimation: Optimal Guarantees Against Sensor Attacks in the Presence of Noise.", IEEE International Symposium on Information Theory (ISIT), 2015, (pp. 2929-2933, 5 total pages).

International Search Report and Written Opinion issued in connection with corresponding PCT Application No. PCT/US2018/012858 dated May 4, 2018.

Mestha, L. K., et al., Cyber-Attack Detection and Neutralization, GE Co-Pending U.S. Appl. No. 15/447,861, filed Mar. 2, 2017.

* cited by examiner

FIG. 6

CYBER-ATTACK DETECTION AND NEUTRALIZATION

CROSS-REFERENCE TO RELATED APPLICATION(S)

This application claims the benefit under 35 USC § 120 of U.S. patent application Ser. No. 15/447,861, filed on Mar. 2, 2017, the entire disclosure of which is incorporated by reference herein for all purposes.

GOVERNMENT INTEREST

This invention was made with Government support under contract number DEOE0000833 awarded by the United States Department of Energy. The Government has certain rights in this invention.

BACKGROUND

Machine and equipment assets, generally, are engineered to perform particular tasks as part of a business process. For example, assets can include, among other things and without limitation, industrial manufacturing equipment on a production line, drilling equipment for use in mining operations, wind turbines that generate electricity on a wind farm, transportation vehicles, and the like. As another example, assets may include healthcare machines and equipment that aid in diagnosing patients such as imaging devices (e.g., X-ray or MRI systems), monitoring devices, and the like. The design and implementation of these assets often takes into account both the physics of the task at hand, as well as the environment in which such assets are configured to operate.

Low-level software and hardware-based controllers have long been used to drive machine and equipment assets. However, the rise of inexpensive cloud computing, increase in sensor capabilities, decrease in sensor costs, and the proliferation of mobile technologies have generated new opportunities for creating novel industrial and healthcare based assets with improved sensing technology and which are capable of transmitting data that can then be distributed throughout a network. As a consequence, there are new opportunities to enhance the business value of some assets through the use of novel industrial-focused hardware and software.

To prevent infection, human beings have developed various environmental precautions (e.g., public health programs, clean water etc.) as well as external physical protection mechanisms (e.g., washing hands, protective clothing etc.). Despite these protections in place, various pathogens are able to attack the human body. In response, biological structures of a person's immune system may constantly defend against these pathogens to keep the body functioning. In a similar fashion, to protect industrial control systems, information technology mechanisms (e.g., anti-virus software, trusted boot, etc.) has been developed as well as operational technology mechanisms (e.g., Opshield, SecurityST, etc.) have been developed.

However, information technology and operational technology protection mechanisms are inadequate. As a result, cyber threats continue to grow in number and sophistication. Attackers have shown the ability to find and exploit residual faults and use them to formulate cyber-attacks. Most software systems in use today run substantially similar software. As a result, a successful cyber-attack can bring down a large number of installations running similar software. Furthermore, as more software is made available (e.g., through the cloud), the situation can only get worse. Accordingly, what is needed is a better method for protecting control systems against cyber-attacks.

SUMMARY

Embodiments described herein improve upon the prior art by providing an attack detection and neutralization system and method capable of masking the effects of a cyber-attack on a physical asset such as a machine or equipment. The system may receive an incoming signal sensed from or about a physical asset, filter the signal to detect and remove an attack signature, and output the signal to a control system. In some aspects, the method can be implemented as software that is deployed on a cloud platform such as an Industrial Internet of Things (IIoT).

In an aspect of an embodiment, provided is a method including receiving input signals from an asset comprising time series data associated with the asset and transforming the input signals into feature values in a feature space, detecting one or more abnormal feature values in the feature space based on a predetermined normalcy boundary associated with the asset, and determining an estimated true value for each abnormal feature value, and performing an inverse transform of each estimated true value to generate neutralized signals comprising time series data and outputting the neutralized signals.

In an aspect of another embodiment, provided is computing system including a receiver configured to receive input signals from an asset comprising time series data associated with the asset, a processor configured to transform the input signals into feature values in a feature space, detect one or more abnormal feature values in the feature space based on a predetermined normalcy boundary associated with the asset, determine an estimated true value for each abnormal feature value, and perform an inverse transform of each estimated true value to generate neutralized signals comprising time series data, and an output configured to output the neutralized signals.

In an aspect of another example embodiment, provided is a non-transitory computer readable storage medium having stored therein instructions that when executed cause a processor to perform a method including receiving input signals from an asset comprising time series data associated with the asset and transforming the input signals into feature values in a feature space, detecting one or more abnormal feature values in the feature space based on a predetermined normalcy boundary associated with the asset, and determining an estimated true value for each abnormal feature value, and performing an inverse transform of each estimated true value to generate neutralized signals comprising time series data and outputting the neutralized signals.

Other features and aspects may be apparent from the following detailed description taken in conjunction with the drawings and the claims.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown.

The example embodiments are directed to a system and method for identifying and neutralizing threats that occur in systems, for example, control systems for industrial manufacturing. The method described herein may achieve resiliency to cyber-attacks to provide uninterrupted, equipment-safe, controlled operation while attacks are in progress. As described herein, resiliency is the ability of a control system to force signals (or states) required for operational normalcy. As in a human body, once the method described herein detects a threat (e.g., an infection), the method destroys the threat. Analogous to biomimicry stated above, the example embodiments are directed to a method that extends domain-level security by creating a cyber-based "immune system" specifically desirable to industrial systems.

The methods herein are not only able to identify threats, but may also block the threats by automatically neutralizing their effects on the control system even while the attacks are in progress. Neutralization of the affects may be achieved at key signals by estimating true operational states of the system with new boundary and performance constrained resilient estimators (BPRE). Furthermore, true signals for operational normalcy may be computed from estimated states enabling the system to continue to function properly. The method and system described herein can deter threats by replicating protection mechanisms adapted by biological systems. How the human body fights off pathogens and other infections is a natural marvel. It automatically detects and triggers a self-defense mechanism to fight. The example embodiments replicate a similar kind of automatic detection and trigger functions for masking or otherwise neutralizing the attack signals. The neutralization approach disclosed here can also be used for securing any system where continuous data stream is available for monitoring purpose.

The neutralization methods described herein may be implemented as software such as an application or a service and may be incorporated within an industrial system such as a control system, a computer, a server, a cloud platform, a machine, an equipment, an aircraft, a locomotive, and the like. While progress with machine and equipment automation has been made over the last several decades, and assets have become 'smarter,' the intelligence of any individual asset pales in comparison to intelligence that can be gained when multiple smart devices are connected together, for example, in the cloud. As described herein, an asset is used to refer to equipment and/or a machine used in fields such as energy, healthcare, transportation, heavy manufacturing, chemical production, printing and publishing, electronics, textiles, and the like. Aggregating data collected from or about multiple assets can enable users to improve business processes, for example by improving effectiveness of asset maintenance or improving operational performance if appropriate industrial-specific data collection and modeling technology is developed and applied.

For example, an asset can be outfitted with one or more sensors configured to monitor respective operations or conditions thereof. Data from the sensors can be added to the cloud platform. By bringing such data into a cloud-based environment, new software applications and control systems informed by industrial process, tools and expertise can be constructed, and new physics-based analytics specific to an industrial environment can be created. Insights gained through analysis of such data can lead to enhanced asset designs, enhanced software algorithms for operating the same or similar assets, better operating efficiency, and the like. However, when data is transferred from an edge of the cloud to the cloud platform, attacks may occur. The attacks may affect the processing of signals received from the edge of the cloud. The example embodiments provide a neutralization process that is capable of filtering signals that are transmitted from the edge to the cloud platform back-end, as well as transmitting in other situations.

Assets described herein can include or can be a portion of an Industrial Internet of Things (IIoT). In an example, an IIoT connects assets including machines and equipment, such as turbines, jet engines, healthcare machines, locomotives, oil rigs, and the like, to the Internet and/or a cloud, or to each other in some meaningful way such as through one or more networks. The examples described herein can include using a "cloud" or remote or distributed computing resource or service. The cloud can be used to receive, relay, transmit, store, analyze, or otherwise process information for or about one or more assets. In an example, a cloud computing system includes at least one processor circuit, at least one database, and a plurality of users or assets that are in data communication with the cloud computing system. The cloud computing system can further include or can be coupled with one or more other processor circuits or modules configured to perform a specific task, such as to perform tasks related to asset maintenance, analytics, data storage, security, or some other function.

However, the integration of assets with the remote computing resources to enable the IIoT often presents technical challenges separate and distinct from the specific industry and from computer networks, generally. A given machine or equipment based asset may need to be configured with novel interfaces and communication protocols to send and receive data to and from distributed computing resources. Assets may have strict requirements for cost, weight, security, performance, signal interference, and the like, in which case enabling such an interface is rarely as simple as combining the asset with a general-purpose computing device. To address these problems and other problems resulting from the intersection of certain industrial fields and the IIoT, embodiments provide a cloud platform that can receive and deploy applications from many different fields of industrial technologies. In order for these applications to successfully consume data from machines and equipment also connected to the cloud, the embodiments provide a threat neutralization method that can be implemented within the cloud and that can filter signals between an edge of the cloud and the cloud platform enabling the control of the asset to be maintained as normal.

The Predix™ platform available from GE is a novel embodiment of an Asset Management Platform (AMP) technology enabled by state of the art cutting edge tools and cloud computing techniques that enable incorporation of a manufacturer's asset knowledge with a set of development tools and best practices that enables asset users to bridge gaps between software and operations to enhance capabilities, foster innovation, and ultimately provide economic value. Through the use of such a system, a manufacturer of assets can be uniquely situated to leverage its understanding of assets themselves, models of such assets, and industrial operations or applications of such assets, to create new value for industrial customers through asset insights.

Figure 1:
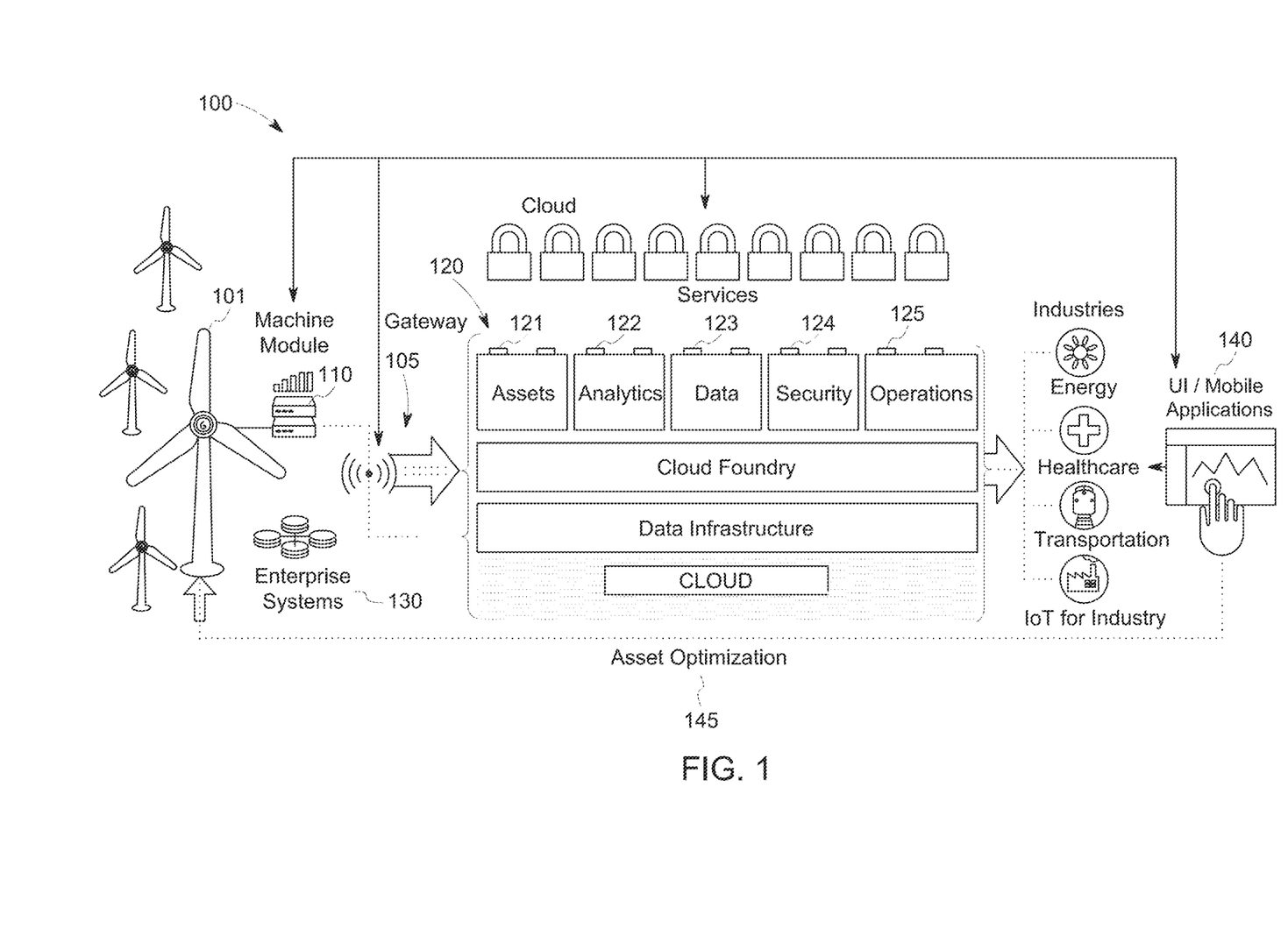
FIG. 1 is a diagram illustrating a cloud-computing environment associated with industrial systems in accordance with an example embodiment.

FIG. 1 illustrates a cloud computing environment associated with industrial systems in accordance with an example embodiment. FIG. 1 illustrates generally an example of portions of an asset management platform (AMP) 100. As further described herein, one or more portions of an AMP can reside in a cloud computing system 120, in a local or sandboxed environment, or can be distributed across multiple locations or devices. The AMP 100 can be configured to perform any one or more of data acquisition, data analysis, or data exchange with local or remote assets, or with other task-specific processing devices. The AMP 100 includes an asset community (e.g., gas turbines, wind turbines, healthcare machines, industrial systems, manufacturing systems, oil rigs, etc.) that is communicatively coupled with the cloud computing system 120. In an example, a machine module 110 receives information from, or senses information about, at least one asset member of the asset community, and configures the received information for exchange with the cloud computing system 120. In an example, the machine module 110 is coupled to the cloud computing system 120 or to an enterprise computing system 130 via a communication gateway 105.

In an example, the communication gateway 105 may include or may use a wired or wireless communication channel that extends at least from the machine module 110 to the cloud computing system 120. The cloud computing system 120 may include several layers, for example, a data infrastructure layer, a cloud foundry layer, and modules for providing various functions. In FIG. 1, the cloud computing system 120 includes an asset module 121, an analytics module 122, a data acquisition module 123, a data security module 124, and an operations module 125, but the embodiments are not limited thereto. Each of the modules includes or uses a dedicated circuit, or instructions for operating a general purpose processor circuit, to perform the respective functions. In an example, the modules 121-125 are communicatively coupled in the cloud computing system 120 such that information from one module can be shared with another. In an example, the modules 121-125 are co-located at a designated datacenter or other facility, or the modules 121-125 can be distributed across multiple different locations.

An interface device 140 (e.g., user device, workstation, tablet, laptop, appliance, kiosk, and the like) can be configured for data communication with one or more of the machine module 110, the gateway 105, and the cloud computing system 120. The interface device 140 can be used to monitor or control one or more assets. As another example, the interface device 140 may be used to develop and upload applications to the cloud computing system 120. As another example, the interface device 140 may be used to access analytical applications deployed on the cloud computing system 120. In an example, information about the asset community may be presented to an operator at the interface device 140. The information about the asset community may include information from the machine module 110, information from the cloud computing system 120, and the like. The interface device 140 can include options for optimizing one or more members of the asset community based on analytics performed at the cloud computing system 120.

The example of FIG. 1 includes the asset community with multiple wind turbine assets, including the wind turbine 101. However, it should be understood that wind turbines are merely used in this example as a non-limiting example of a type of asset that can be a part of, or in data communication with, the first AMP 100. Examples of other assets include gas turbines, steam turbines, heat recovery steam generators, balance of plant, healthcare machines and equipment, aircraft, locomotives, oil rigs, manufacturing machines and equipment, textile processing machines, chemical processing machines, mining equipment, and the like.

FIG. 1 further includes the device gateway 105 configured to couple the asset community to the cloud computing system 120. The device gateway 105 can further couple the cloud computing system 120 to one or more other assets or asset communities, to the enterprise computing system 130, or to one or more other devices. The AMP 100 thus represents a scalable industrial solution that extends from a physical or virtual asset (e.g., the wind turbine 101) to a remote cloud computing system 120. The cloud computing system 120 optionally includes a local, system, enterprise, or global computing infrastructure that can be optimized for industrial data workloads, secure data communication, and compliance with regulatory requirements.

The cloud computing system 120 can include the operations module 125. The operations module 125 can include services that developers can use to build or test Industrial Internet applications, and the operations module 125 can include services to implement Industrial Internet applications, such as in coordination with one or more other AMP modules. In an example, the operations module 125 includes a microservices marketplace where developers can publish their services and/or retrieve services from third parties. In addition, the operations module 125 can include a development framework for communicating with various available services or modules. The development framework can offer developers a consistent look and feel and a contextual user experience in web or mobile applications. Developers can add and make accessible their applications (services, data, analytics, etc.) via the cloud computing system 120.

Information from an asset, about the asset, or sensed by an asset itself may be communicated from the asset to the data acquisition module 123 in the cloud computing system 120. In an example, an external sensor can be used to sense information about a function of an asset, or to sense information about an environment condition at or near an asset. The external sensor can be configured for data communication with the device gateway 105 and the data acquisition module 123, and the cloud computing system 120 can be configured to use the sensor information in its analysis of one or more assets, such as using the analytics module 122. Using a result from the analytics module 122, an operational model can optionally be updated, such as for subsequent use in optimizing the first wind turbine 101 or one or more other assets, such as one or more assets in the same or different asset community. For example, information about the wind turbine 101 can be analyzed at the cloud computing system 120 to inform selection of an operating parameter for a remotely located second wind turbine that belongs to a different asset community.

The cloud computing system 120 may include a Software-Defined Infrastructure (SDI) that serves as an abstraction layer above any specified hardware, such as to enable a data center to evolve over time with minimal disruption to overlying applications. The SDI enables a shared infrastructure with policy-based provisioning to facilitate dynamic automation, and enables SLA mappings to underlying infrastructure. This configuration can be useful when an application requires an underlying hardware configuration. The provisioning management and pooling of resources can be done at a granular level, thus allowing optimal resource allocation. In addition, the asset cloud computing system 120 may be based on Cloud Foundry (CF), an open source PaaS that supports multiple developer frameworks and an ecosystem of application services. Cloud Foundry can make it faster and easier for application developers to build, test, deploy, and scale applications. Developers thus gain access to the vibrant CF ecosystem and an ever-growing library of CF services. Additionally, because it is open source, CF can be customized for IIoT workloads.

The cloud computing system 120 can include a data services module that can facilitate application development. For example, the data services module can enable developers to bring data into the cloud computing system 120 and to make such data available for various applications, such as applications that execute at the cloud, at a machine module, or at an asset or other location. In an example, the data services module can be configured to cleanse, merge, or map data before ultimately storing it in an appropriate data store, for example, at the cloud computing system 120. A special emphasis may be placed on time series data, as it is the data format that most sensors use.

Security can be a concern for data services that exchange data between the cloud computing system 120 and one or more assets or other components. Some options for securing data transmissions include using Virtual Private Networks (VPN) or an SSL/TLS model. In an example, the AMP 100 can support two-way TLS, such as between a machine module and the security module 124. In an example, two-way TLS may not be supported, and the security module 124 can treat client devices as OAuth users. For example, the security module 124 can allow enrollment of an asset (or other device) as an OAuth client and transparently use OAuth access tokens to send data to protected endpoints.

The threat detection and neutralization system and method according to various embodiments may be implemented within the security module 124 stored on the cloud computing system 120, within the asset, within an intermediate device between the asset and a control system, and the like. As another example, the threat detection and neutralization method may also or instead be implemented elsewhere such as within an asset, within the cloud computing system 120, within another device within the system, and the like. Raw data may be provided to the cloud computing system 120 via the assets included in the asset community and accessed by applications deployed on the cloud computing system 120. During operation, an asset may transmit sensor data to the cloud computing system 10 and prior to the cloud computing system 120 storing the sensor data, the sensor data may be filtered using the threat detection and neutralization method described herein.

Figure 2:
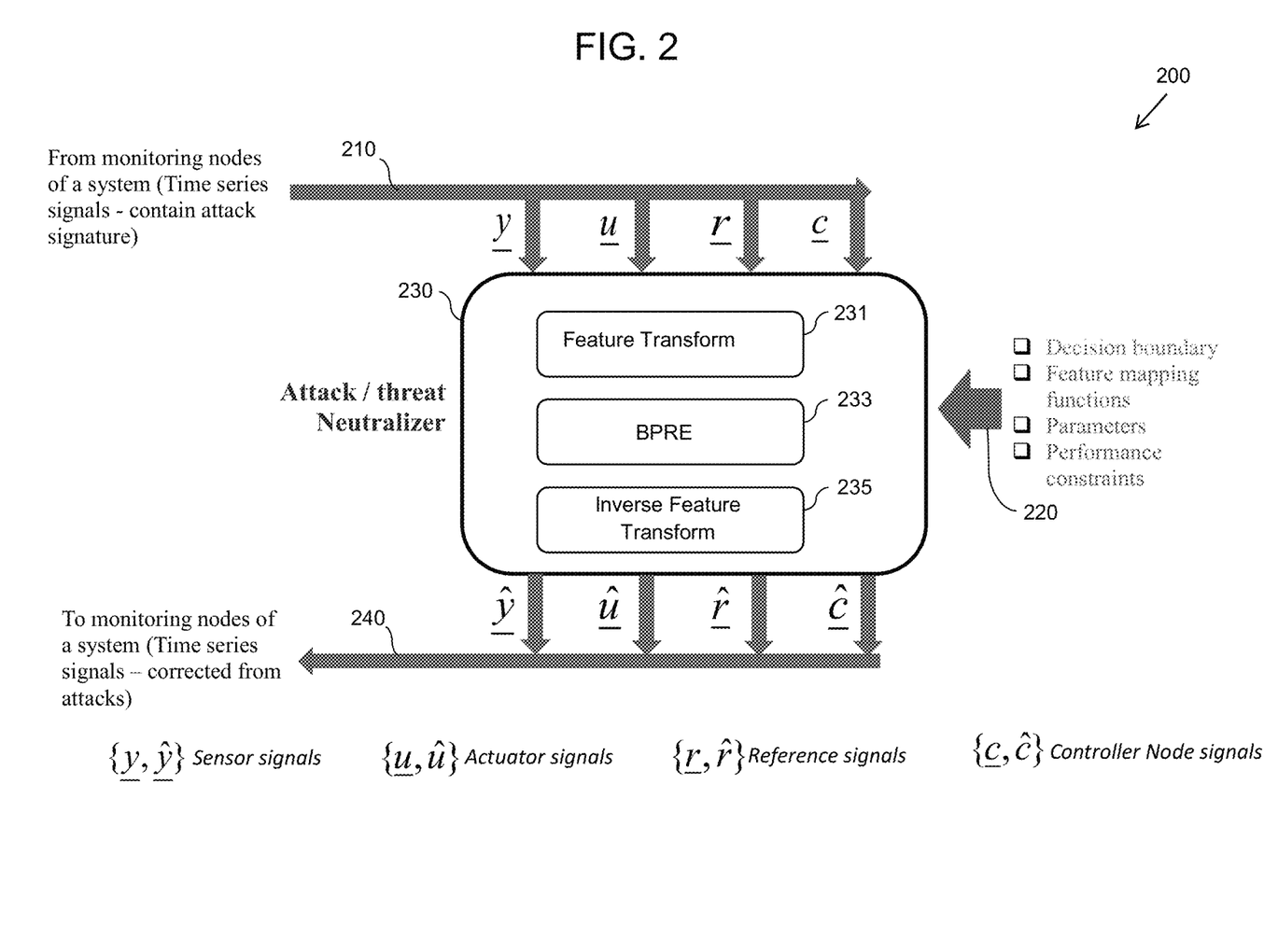
FIG. 2 is a diagram illustrating a threat neutralizer for filtering input signals in accordance with an example embodiment.

FIG. 2 illustrates a threat neutralizer 230 for filtering input signals in accordance with an example embodiment. The threat neutralizer 230 may be implemented within an asset or a device associated therewith, within a control system or a device associated with or coupled to the control system, within a cloud platform, within an intermediate device, and the like. There is no limitation on a location of the threat neutralizer 230. The threat neutralizer 230 may receive signals that have been sensed from or about an asset such as a gas turbine, a wind turbine, a locomotive, an aircraft, a healthcare machine, an industrial manufacturing machine, drilling machinery/equipment, mining machinery/equipment, and the like. The threat neutralizer receives at least one input signal 210 that includes time series data. The time series data may include measurements or other readings captured at various time intervals. Examples of time series data include speed, intensity, acceleration, weight, force, thrust, and the like.

When deployed and operating, assets may be attacked or otherwise compromised. As a result, the data received from an asset (e.g., input signals 210) may be faulty or otherwise inaccurate. There are many different types of attacks that an asset system may be subjected to such as espionage attacks, denial of service attacks, deception attacks (e.g., covert/stealthy attack, zero dynamics attack, false data injection attack, replay attack, and the like, which are just a short sampling of potential threats that exist. Present information technology and operational technology approaches do not adequately protect the system automatically. In contrast, as further described herein, the threat neutralizer 230 may automatically detect and neutralize the effects of an attack within an input signal 210 just as a human immune system is capable of detecting and neutralizing an infection or other disease.

As an example, the threat neutralizer 230 may be included in a general system such as a cyber-physical system, a software system, a bio-mechanical system, a network system, a communication system, and/or the like, which contains access to continuous stream of data in the form of time series signals. The time series signals may be generated from output sensor nodes (e.g., physical and/or virtual sensors), actuator nodes (e.g., hard and/or soft actuators generated from open or closed loop system), controller nodes (e.g., controller node signals), reference nodes (e.g., reference signals), and the like. In some examples, logical signals may also be considered as time series signals. A total number of signals that may be used for providing immunity to a system may be equal to a total number of nodes that exist in sensors, actuators, controllers and reference nodes, or it may be more or less nodes. Some or all combinations of these nodes can be used for monitoring and neutralization.

In the example of FIG. 2, the threat neutralizer 230 includes multiple computational blocks including a feature transform 231, a Boundary and Performance constrained Resilient Estimator (BPRE) 233, and an inverse feature transform 235, which are further described herein. Using a dynamic or a static model obtained through system identification or other known modeling methods, the BPRE 233 is designed to compute an estimate of the true value of the feature vector under adversarial attacks. The computational elements inside the threat neutralizer 230 may thus act as a filter to remove attack signatures present in each node. As a result, an output signal 240 (or neutralized signals) may contain true estimates of signals at these nodes for use with the rest of the system for operational normalcy. In this example, y corresponds to a sensed signal, u corresponds to an actuator signal, c corresponds to a control node signal, and r corresponds to a reference signal. These are vectors of such signals. For convenience, underscores from each vector are removed.

Feature Transform (Forward and Inverse): For a given scenario, time series signals (e.g., ~45 seconds) may be captured and pre-processed. These signals may be processed by the feature transform 231 into feature extraction algorithms (e.g., principal component analysis) to reduce the dimensionality or order of the system. For example, time series data from sensor nodes may be converted into feature vectors. The procedure is same for all other signals. When principal components are used as features as in the current implementation, weights become the features in reduced dimensions within the feature space. In the pre-processing step performed by the feature transform 231, temporal normalization of node data may be performed. As an example, when principal components are used as features, the normalized output may be expressed as a weighted linear combination of basis functions. In this feature extraction algorithm, weights are considered as features for y. The forward and inverse feature transforms can be written as:

Forward feature transform:

$$y = y_0 + \sum_{j=1}^{M} w_j \psi_j$$

$$w_j = \psi_j^T (y - y_0)$$

Inverse feature transform:

$$\hat{y} = y_0 + \sum_{j=1}^{M} \hat{w}_j \psi_j \quad \text{Equation 1}$$

Because of the orthonormal nature of the basis vectors, each feature may be computed during forward transform using Equation 1 shown above. In this example, $y_0$=average sensor output, $w_j$=jth weight (i.e., PCA feature), and $\psi_j$=jth basis vector. $\hat{w}_j$=jth weight (true feature). $\hat{y}$ is the estimated sensor output in original time space, the true signal for normalcy under attack which is obtained by estimating true feature from boundary and performance constrained resilient estimator and solving the inverse feature transform equation in Equation 1, unit 235. The basis vectors can be obtained using ensemble data set from the system collected over time (i.e., historical data) or with perturbations on a virtual model (e.g., digital twin) of the asset.

System Identification (Dynamic Modeling): Under normal operation, features are extracted from overlapping batch of a time series data by the Feature Transform unit 231. The process may be continued by the Feature Transform unit 231 over each overlapping batch resulting in a new time series of feature evolution in the feature space. Then, the feature time series are used for performing system identification (i.e., dynamic modeling). A selected subset of the features may be used for dynamic modeling using state space system identification methods. For example, in a gas turbine system, out of 15 PCA features for each sensor node, 5 PCA features may be used.

The dynamic models are in the state space format. The dynamic modeler may use multivariate vector autoregressive model (VAR) for fitting dynamic models into feature time series data. If this approach is not adequate, another model may be used such as a tuned feature-based digital twin model, or a static model computed from feature evolution data or a priori to obtain various matrices representing state space form (i.e., system matrix, control matrix, output matrix and feedforward matrix; i.e., {A, B, C} matrices). In the example of a gas turbine system, the time-series evolution of the features may be modeled using the following state-space dynamics:

$$x(k+1) = Ax(k) + b$$

$$y(k) = Cx(k) + e(k) \quad \text{Equation 2}$$

In the example of Equation 2, e(k) is the attack component of the "measured" feature vector, y(k). Here, x(k) is the "true" feature vector to be determined. System matrix, A, control vector, b, and output matrix, C, are computed offline using experimental and simulated data and may be updated in real-time using real-time features obtained from actual sensor measurements.

Boundary and Performance Constrained Resilient Estimator (BPRE): The example embodiments attempt to estimate true states using a modified resilient estimator called Boundary and Performance Constrained Resilient Estimator (BPRE) 233. Using a model represented by the operator, Ω(A, b, C), such as for the example state-space model shown above in Equation 2, the BPRE 233 is designed to estimate the true value of the feature vector under adversarial attacks. The BPRE 233 is a resilient estimator that may solve the following optimization problem:

$$\underset{x_k \in \mathbb{R}^n, k \in \{1, \ldots, T\}}{\text{minimize}} \sum_{k=1}^{T} \| y_k - \Omega(A, b, C)x_k - y_b \|_q + \frac{1}{2} \rho \sum_{j=1}^{T-1} \| x_j^{prev} - x_j \|_2^2$$

subject to score $(x_k, p_1) \le -\epsilon$ $|f(x_k, p_2)| \le \varepsilon$ for $k \in \{1, \ldots, T-1\}$ With the parameters of the optimization:

$$\Omega(A, b, C) = \begin{bmatrix} \Psi_1 & & \\ & \ddots & \\ & & \Psi_n \end{bmatrix} \Phi \text{ and } y_b = y_0 + \begin{bmatrix} \Psi_1 & & \\ & \ddots & \\ & & \Psi_n \end{bmatrix} w_0 \quad \text{Equation 3}$$

Figure 3:
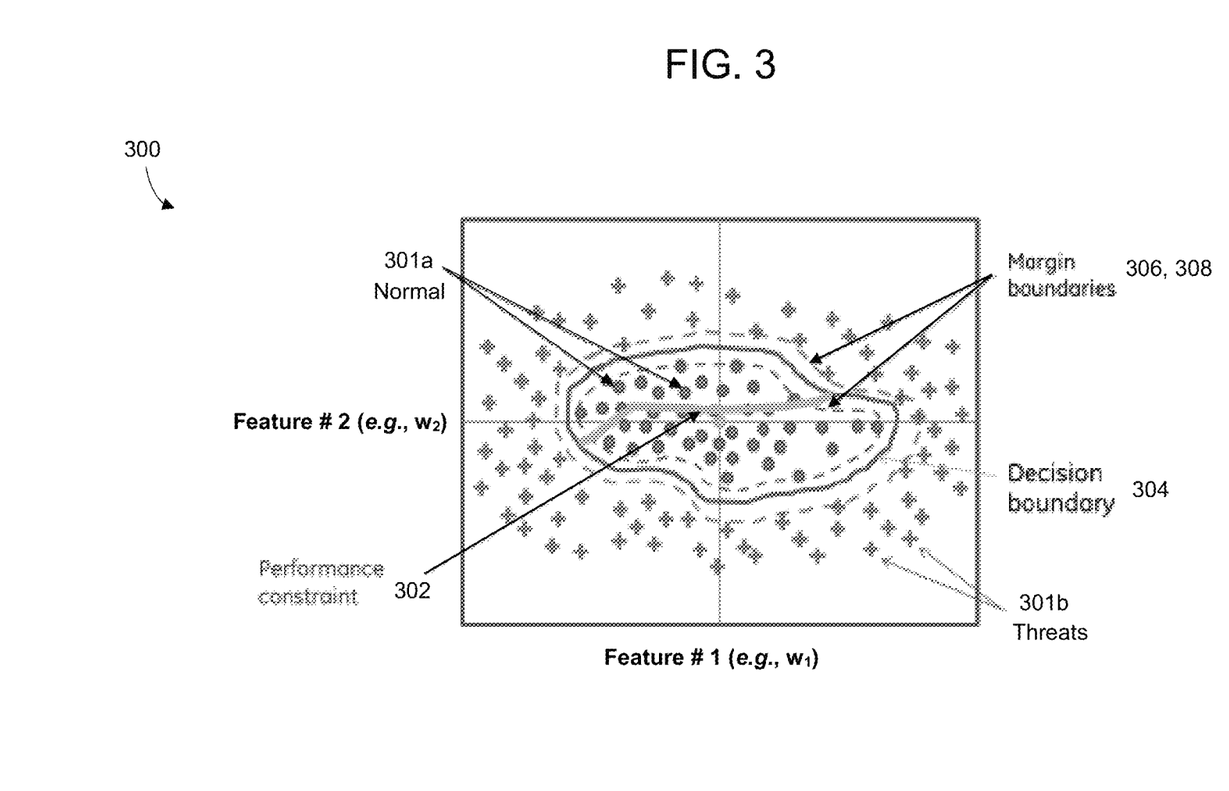
FIG. 3 is a diagram illustrating a boundary and performance estimation process for threat detection in accordance with an example embodiment.

In this example, $y_k$ is the sequence of measured/observed values, $x_k$ is the feature vector in the current time step, $x_k^{prev}$ is the feature vector in the previous time step, Ω(A, b, C) is an operator representing state space model or a transfer function from the feature space to the signal space. $p_1$ and $p_2$ are respective parameter values for the boundary and invariance relationship. q is used to describe optimization approach such as $l_1$ when q=1, $l_2$ when q=2 well-known in the optimization literature. The first constraint in the optimization may ensure that the final estimate falls within the safety envelop with some factor of safety given by $\epsilon$ which can be an arbitrary positive number, or something more intuitive like the distance of the farthest support vector from the multi-dimensional decision boundary. The BPRE 233 may compute a threat/attack boundary and also compute a performance constrained resilient estimator from the normal data values received historically from the asset. FIG. 3 illustrates conceptually an example of a boundary and performance estimation process for threat detection in accordance with an example embodiment. In the example of FIG. 3, a graphical view 300 of the boundary constraint is shown with inner margin boundary 306 specified by positive $\epsilon$. Negative $\epsilon$ represents outer margin boundary 308. Also, $\epsilon$=0 represents hard decision boundary 304. The "score" function in Equation 3 depends on a particular algorithm used to learn the safety envelop. For instance:

$$\text{score}(x, p) = \phi(x)^T p_{1:n} + p_0 \qquad \text{Equation 4}$$

Equation 4 defines the safety envelop obtained using a support vector machine (SVM) with kernel function $\phi(.)$. The second constraint is related to achieving normal performance by the system. Here, the ensuing solution may satisfy an implicit invariance relationship inherent to the system that was operating normally and is shown graphically in FIG. 3 by a thick curve 302 inside the normal operating space. This constraint is termed "performance constraint" and may be required during optimization. The value $\epsilon$ is used to capture the uncertainty due to noise in the system. For example, in the case of PCA, the invariance relation is captured by the singular vectors corresponding to the smallest singular values of the feature covariance of data matrix. For example, let $Y'[y_1 \ldots y_T]$ be the data matrix constructed using ensemble data set from the system collected over time (i.e., historical data) or with perturbations on digital twin models of the asset with each row being the corresponding instantaneous time-series measurement. Then the invariance relationship is captured by the linear inequality $l \leq VY \leq u$, where (l,u) are the minimum and maximum values in the matrix VY and the columns of V are the singular vectors of $Y^T Y$ corresponding to the smallest singular values.

In FIG. 3, the feature vectors corresponding to normal operating signals 301a are not considered potential threats while the feature vectors positioned outside the boundary 304 are considered threats 301b or attack signals. These points outside the boundary may also be referred to as attack points 301b. These attack points may be due to cyberattacks moving the previously normal feature vectors represented by points anywhere near or on the normal performance region 302 to anywhere to the attack region designated by points 301b. Referring now to both FIGS. 2 and 3, if the feature vectors are outside the boundary 304, indicating an abnormal event 301b, the BPRE estimator 233 can find an estimate of the feature vector along performance constraints inside the boundary 304 that preserves the normal operation of the asset with respect to the control system or other device connected to the asset.

The optimization used in Equation 3 contains two weighted objectives. The first objective involves a q-norm (q $\in \{0, 1, 2, \ldots\}$) of the error between observed and modeled features. Although, q=0 is ideal for this problem, it results in an NP-hard problem. Consequently, in order to have a well-behaved convex program, the value q≥1 may be used, where the particular value used in any case may depend on the desired error characteristics for that case. For instance, the value q=1 may provide the closest approximation to the ideal case but results in a mixed-norm problem while the value q=2 is further from ideal but unifies the norm in the objective and the overall optimization problem is a subclass of the well-known second order cone program. The measured, as well as estimated "true" feature vectors may then be transformed into time series signal by inverting the feature transform.

An example of solving for the boundary and performance constraint shown above in Equation 3 is described as follows. It should be appreciated that the following equations are just one example, and many examples are possible. Often it will be useful to normalize sensor signals to some nominal operating condition temporally and spatially before performing feature transform. Consider, for example, temporal normalization of monitoring node data that may be performed as follows at every sample along a time axis:

$$y_N = \frac{(y_{nom} - y_{UN})}{\bar{y}_{nom}} \qquad \text{Equation 5}$$

Where $y_N$ is the normalized signal, $y_{UN}$ is the un-normalized signal and $y_{nom}$ is the sensor signal for nominal operating condition and $\bar{y}_{nom}$ is a temporal average of a time series signal for normal operating conditions. In this case, to obtain feature transform a temporal average is computed for a batch length (e.g., 45 seconds). De-normalization involves obtaining the sensor signals in original un-normalized space by inverting the equation above.

Feature transform involves transforming signals from a Hilbert space (H) to a finite dimensional Euclidean space. In order to facilitate easy inversion, this transformation may be done via orthogonal functional basis set. For the signal $y \in \mathbb{H}$, the feature, $w \in \mathbb{R}^n$, is given by:

$$w(t) = \arg\min_{x \in \mathbb{R}^n} \int_{t-T}^{t} \left( y(\tau) - \sum_{j=1}^{n} x_j \Psi_j(\eta_L(\tau)) \right)^2 d\tau \quad (2) \qquad \text{Equation 6}$$

where $\eta_t:[t-T, t] \to [-1, 1]$ and $\Psi_j \in \mathbb{H}^{[-1, 1]}$, j=1, ..., n are orthogonal basis functions. Hence, the solution to the above optimization problem is given by:

$$w_j = \frac{\langle \Psi_j, y \rangle}{\langle \Psi_j, \Psi_j \rangle} \qquad \text{Equation 7}$$

The inverse feature transform is then given by:

$$\hat{y}(t) = \sum_{j=1}^{n} w_j(t) \Psi_j(\eta_t(t)). \qquad \text{Equation 8}$$

In general, there are many available choices for the orthogonal basis; from trigonometric, to orthogonal polynomials like Legendre, Laguerre, Hermite and Chebyshev. However, the signals considered in this paper are sampled at specific intervals and for each signal, there is a design of experiment done to collect a finite data set consisting of points that characterizes the operating space of that signal. Consequently, PCA is used to obtain an orthonormal set which serves as the functional basis for this application. The feature transform for the $i^{th}$ monitoring nodes is then obtained as:

$$y_{N_i} = y_{0_i} + \Psi_i w_i \quad \text{Equation 9}$$

where $y_{0_i} \in \mathbb{R}^{n_T}$ is the ensemble average for the signal, $\Psi_i \in \mathbb{R}^{n_T \times n}$ is a matrix whose columns are the basis vectors, $w_i \in \mathbb{R}^{n_T}$ is the corresponding feature, and $n_T$ is the number of sample points in the interval [t–T, t]. It is noteworthy that the features are obtained from a sliding window batch of data as elucidated in (Equation 6). Hence, the features themselves are time series signals.

For the boundary and performance constrained resilient estimator, a labeled data set may be generated that consists of attack and normal scenarios. The data set may be generated from realistic runs on high fidelity industry standard models. The different normal and attack scenarios may be selected by the system domain experts. First, a decision boundary that separates attack from safe is constructed using various kernel methods. The BPRE may combine concepts from compressed sensing with the binary classifier decision function to estimate the "true" features of the time series signals. The objective is to find the features that best explains the measurement and are also classified as "normal" by the decision function. Normal features represent safe operation with reasonable operational performance. As a result, the approach successfully fuses domain knowledge with compressed sensing. Another merit of this approach is that the domain knowledge, in the form of the decision function, can be updated online whenever new knowledge becomes available.

In this example, to perform the boundary decision function, first, feature transform is done independently for each monitoring node. These nodal features are referred to as local features. The local features from all monitoring nodes are then stacked into one big vector, on which further dimensionality reduction is carried out to obtain what is referred to as global features. The local features capture time-related signatures from the signals from each monitoring nodes while the global features capture cross-relational signatures among monitoring nodes. The two-level feature transform is described by the following:

$$y_N = y_0 + \Psi w \quad \text{Equation 10}$$

$$w = w_0 + \Phi g \quad \text{Equation 11}$$

where $$y_N = \begin{bmatrix} y_{N_1} \\ \vdots \\ y_{N_{n_s}} \end{bmatrix},$$

$$\Psi = \begin{bmatrix} \Psi_1 & & \\ & \ddots & \\ & & \Psi_{n_s} \end{bmatrix},$$

$$w = \begin{bmatrix} w_1 \\ \vdots \\ w_{n_s} \end{bmatrix}$$

with $n_s$ the number of monitoring nodes, $w_i \in \mathbb{R}^{n_L}$ the ith local feature vector, $\Psi_i \in \mathbb{R}^{n_T \times n_L}$ the ith local base matrix, $g \in \mathbb{R}^{n_G}$ the global features vector, $\Psi \in \mathbb{R}^{n_T \times n_G}$ the global basis matrix, and $n_L$ & $n_G$ the numbers of local and global features respectively. The 0th terms are ensemble averages of corresponding quantities. After combining the equations above, the conversion from global feature space to signal space is given by:

$$y_N = \underbrace{y_0 + \Psi w_0}_{y_b} + \underbrace{\Psi \Phi g}_{\Omega}. \quad \text{Equation 12}$$

The parameters $y_0$, $w_0$, $\Psi$ and $\Phi$ are obtained offline and can be updated independently of the resilient estimator.

Next, using the attack/safe labels of the data set together with global features, a kernel-based binary classifier is constructed. The classification decision function (or score) is of the form $$s(g) = \sum_{i=1}^{m} q_i \kappa(x_i, g) + b_s \quad \text{Equation 13}$$

where $\kappa(\ldots)$ is the kernel function which computes dot products in the high dimensional RKHS, $x_i$ are the support vectors, $q_i$ and $b_s$ are the associated weights and bias. The decision function based on the score above may be:

$$\text{Status}(g) = \begin{cases} \text{attack} & \text{if } s(g) > 0 \\ \text{normal} & \text{if } s(g) < 0 \end{cases} \quad \text{Equation 14}$$

For the resilient estimator, suppose that the measured signal is given by:

$$y_N = y^*_N + y_a, \quad \text{Equation 15}$$

where $y_a$ is the malicious addition due to an adversarial agent, the objective is to estimate the true signal $Y^*_N$. The attack signal $y_a$ is not limited to a constant bias and could be any dynamically changing and intelligently designed malicious signal. It is assumed that the attack is sparse. In other words, the ratio of compromised nodes is such that there is enough redundancies in the system to facilitate reconstruction. The exact level of redundancy needed to ensure accurate reconstruction of compromised signal is a topic of future work. Equivalently, Equation 15 may be written as:

$$w = w^* + w_a. \quad \text{Equation 16}$$

Consequently, the resilient estimator may be cast as the following optimization problem, as one example solution:

$$\text{Minimize Subject to } \|w_k - w_0 - \Phi g\|_{l_0} \quad \text{Equation 17}$$
$$s(g) < 0$$

In the example of Equation 17, the subscript k is used to indicate the time dependence of the local features. The optimization problem above is NP-hard mainly due to the index minimization objective. This type of objective has been shown to be able to identify attack signals. While, the constraint $s(g)<0$ improves the overall estimation problem by appending domain-level knowledge, it introduces additional complexity because it is in general non-convex. In what follows, a new problem composed of a convex relaxation of the objective and a local approximation of the kernel decision function is described.

Most approaches in literature suggest replacing the index minimization objective with a $l_1$-norm. Here, if the matrix Φ: satisfies certain conditions, this convexification is lossless. Thus, the objective is replaced with $\|w_k - w_0 - \Phi g\|_{l_1}$.

Next, the local approximation of the kernel-decision function is described. The normal constraint s(g)<0 is equivalent to:

$$-\sum_{q_i<0} |q_i| \kappa(x_i, g) < -\sum_{q_j>0} |q_j| \kappa(x_j, g). \qquad \text{Equation 18}$$

In this example, since sgn ($q_i$) is really the label on the ith support vector, the constraint separates the support vectors into two sets and requires that the solution be closer to the "normal" set, where closeness is measured by the dot product in RKHS given by the kernel function. Subsequently, it is assumed that the kernel function is isotropic, for example, $\kappa(x_i, g) = f_\kappa(\|x_i - g\|_Q^2)$. Q≥0. Here, the function $f_\kappa$: $\mathbb{R}_+ \mapsto \mathbb{R}_+$ is continuous and monotonically decreasing. It is clear at this point that the non-convexity is due to the RHS of Equation 18. Hence, the following approximate may be considered:

$$\hat{s}(g) \triangleq \sum_{q_i<0} \|x_i - g\|_{Q_i}^2 + \sum_{q_j>0} q_j^T (x_j - g), \qquad \text{Equation 19}$$

where $Q_i$ and $q_i$ are parameters that are determined locally at each time step. The convex LHS is approximated with quadratic and the non-convex RHS is approximated with linear function. A local binary classification problem is then solved with two requirements: preserve the label of the current measurement and reproduce the labels of the support vectors as much as possible with more emphasis placed on the ones closest to the current operating point.

Therefore, the local classification problem considered may be:

Minimize $$\frac{1}{2}\left(\sum_{q_i<0} \|Q_i\|_F^2 + \sum_{q_j>0} \|q_j\|^2 + \gamma \sum_{i=1}^m d(x_i, g_{k-1}) e_i^2\right)$$

Subject to:

$s_k \hat{s}(g_k) \geq 1$ $s_i \hat{s}(x_j) - 1 + e_i = 0,\ i=1, \ldots, m,$ \qquad Equation 20 where, $g_{k-1}$ is estimated global feature from the previous step. It is used as an indication of the current operating condition, $d(x_i, g_{k-1})$ is a semi-positive valued function used to penalize the importance of the ith support vector.

$(g_k, s_k)$ are the respective global features and SVM score corresponding to the current measurement $(s_i, e_i)$ are the respective SVM score and degree of misclassification of the ith support vector.

The first two terms in the objective corresponds to Vapnik-Chervonenkis (VC) dimension which helps to improve the generalization of the decision function. For simplicity and faster computation, the $Q_i$ s are restricted to a class of diagonal matrices ($Q_i = \text{diag}(q_i)$). As a result, the optimization problem may reduce to:

Minimize:

$$1/2(\|q\|^2 + \gamma\|e\|_D^2)$$

$1 - s_k K_k q \leq 0$ \qquad Equation 21

$SKq - \underline{1} + e = 0$ where $q = [q_1^T, \ldots, q_m^T]^T$, $e = [e_1, \ldots, e_m]^T$, $D = \text{diag}([d(x_1, q_{k-1}), \ldots, d(x_m, g_{k-1})])$, $K_k = [(x_1 - g_k)^T \text{diag}(x_1 - g_k), \ldots ,$ $(x_m - g_k)^T \text{diag}(x_m - g_k)]$, $S = \text{diag}([s_1, \ldots, s_m])$, and $$K = \begin{bmatrix} \underline{0}^T & \cdots & (x_1 - x_m)^T \text{diag}(x_1 - x_m) \\ \vdots & \ddots & \vdots \\ (x_m - x_1)^T \text{diag}(x_m - x_1) & \cdots & \underline{0}^T \end{bmatrix}$$

This is a simple linearly-constrained quadratic program and its dual:

$$\underset{\alpha \geq 0}{\text{Minimize}} \frac{1}{2} a\alpha^2 - b\alpha, \qquad \text{Equation 22}$$

where $H = I + \gamma K^T D K$ $a = K_k^T H^{-1} K_k$ $b = 1 - \gamma s_k K_k^T H^{-1} S D \underline{1},$ has the closed-form solution $$\alpha^* = \max\left\{\frac{b}{a}, 0\right\}. \qquad \text{Equation 23}$$

Hence, the parameters of $\hat{s}(\cdot)$ as given by the solution of the primal problem in Equation 21 are:

$$q^* = H^{-1}(\gamma K^T S D \underline{1} + \alpha^* s_k K_k). \qquad \text{Equation 24}$$

$$H^{-1} = V \begin{bmatrix} (I + \gamma \Sigma_1 \Lambda \Sigma_1)^1 & \\ & I \end{bmatrix} V^T \qquad \text{Equation 25}$$

In this example, the inverse shown in Equation 25, only involves online computation of the inverse of a smaller diagonal matrix.

The relaxed and local approximate optimization problem for the resilient problem is:

Minimize Subject to $\|w_k - w_0 - \Phi g\|_{l_1}$ \qquad Equation 26

$g^T P g + p^T g + r < 0,$

-continued where                                       Equation 27

$$P = \sum_{q_i<0} Q_i$$

$$p = -2\sum_{q_i<0} Q_i x_i - \sum_{q_j>0} q_j$$

$$r = \sum_{q_i<0} \|x_i\|_{Q_i}^2 + \sum_{q_j>0} x_i^T q_j.$$

At this point, the matrix P can in general be indefinite—since there is nothing saying otherwise. One could explicitly impose that constraint in the optimization problem in Equation 21, in which case the ability to derive a closed-form solution is lost and one resorts to iterative solution for the local approximation problem. This may be a good option if there is enough processing speed to handle iterative solutions in both the local approximation and resilient estimation problems. On the other hand, one could allow indefinite P in favor of a closed-form solution for the local approximation problem—as done already. If that is the case, the optimization problem in Equation 26 can be further relaxed as:

Minimize Subject to $\|w_k - w_0 - \Phi g\|_{l_1}$          Equation 28

$\text{trace}(GP) + p^T g + r < 0$ $\begin{bmatrix} G & g \\ g^T & 1 \end{bmatrix} \geq 0.$ The semi-definite program above can be solved sufficiently fast using interior-point methods. As a way of simple summary, the overall resilient estimator algorithm is described in Algorithm 1.

---

Algorithm 1 Boundary and Performance
Constrained Resilient Estimator

--- procedure BPRE($y_k$, $\{x_i, q_i\}$, K)
Normalize:
   $y_{N_k} \leftarrow$ (5)
Local Approximation:
   $w_k \leftarrow$ (10)
   $s_k \leftarrow$ (13)
   $q^* \leftarrow H^{-1} (\gamma K^T SD1 + \alpha^* s_k K_k)$ (24)
Resilient Global feature Vector:
   P,p,r $\leftarrow$ (27)
   $g_k^* \leftarrow \arg\min$(28)
Output:
   $y_{N_k}^* \leftarrow y_b + \Omega g_k^*$ (5)
   return $y_k \leftarrow y_{nom} - \overline{y_{nom}} y_{N_k}^*$

---

The BPRE 233 forces the attacked sensor signals back into the normalcy boundary 304 which also translates to normal operation of the original system. As a result, neutralized signals 240 are output from the threat neutralizer 230. This inversion approach assumes that the feature transform algorithm is well defined and has only trivial kernels (at least injective). The MMMD feature discovery framework may be used to identify knowledge-based, shallow and/or deep learning features. Note that the MMMD feature discovery framework may be associated with feature engineering (e.g., associated with analysis such as batch selection, basis vector computation, feature extraction, dimensionality reduction, etc.) and engineered and dynamic system feature vectors. Knowledge-based feature engineering may use domain or engineering knowledge of the system to create features from different sensor measurements. These features might simply be statistical descriptors (e.g., maximum, minimum, mean, variance, different orders of moments, etc.) calculated over a window of a time-series signal and its corresponding Fast Fourier Transformation ("FFT") spectrum as well. The knowledge-based features might also utilize analysis of the system, such as basis vector decomposition, state estimation, observability matrices, topology matrices, system plant matrices, frequency domain features and system poles and zeros. These analyses may represent a characterization of the system through steady-state, transient, and small signal behaviors. The feature extraction process may be further associated with a shallow feature learning technique, such as unsupervised learning, k-means clustering, manifold learning, non-linear embedding, an isomap method, LLE, PCA as described above in one example, Non-linear PCA, ICA (Independent Component Analysis), neural networks, a SOM (Self-Organizing Map) method, genetic programming, and/or sparse coding. A numerical inversion algorithm may be used to convert true features to their equivalent time series form when the features are not well defined as in the PCA case described above. Furthermore, smoothing of the time series signal from previous batches may be required while performing continuous updates.

Figure 4:
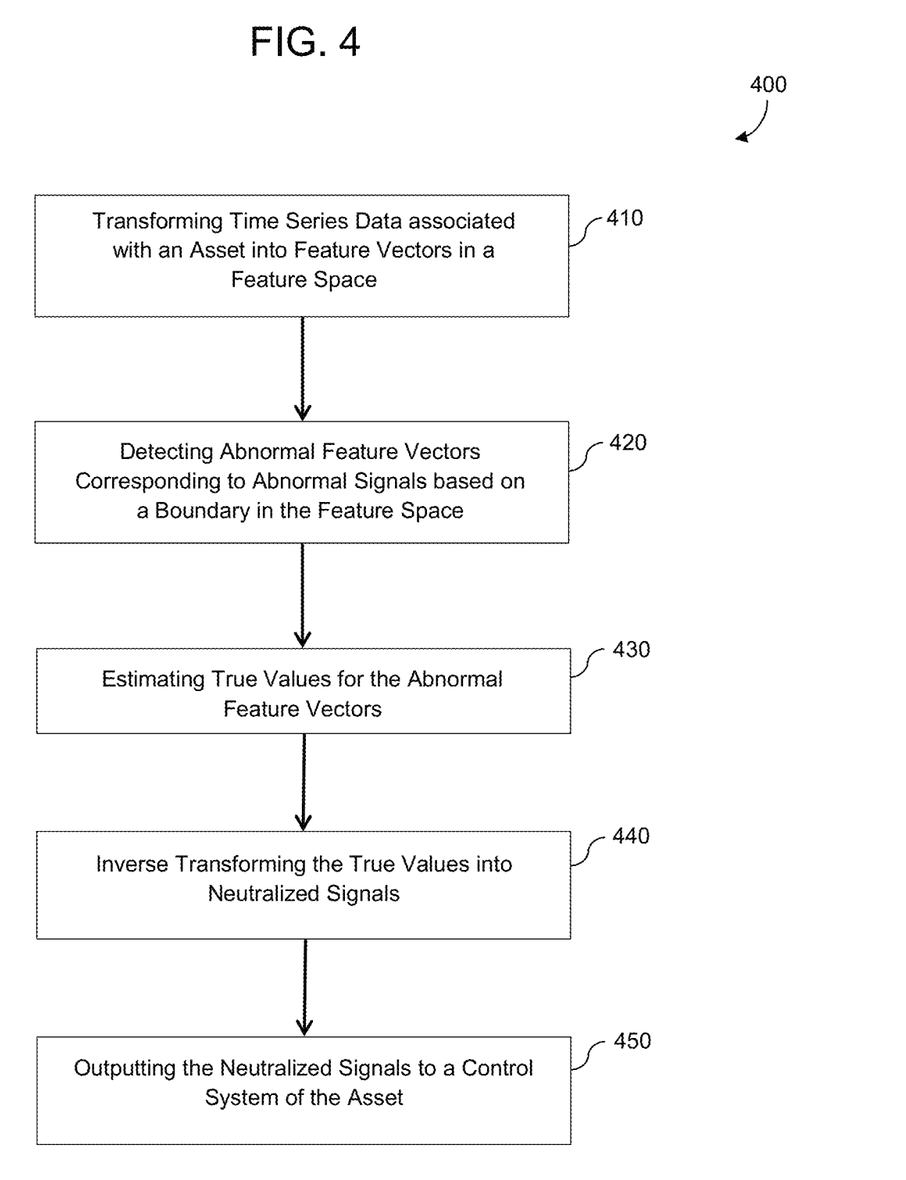
FIG. 4 is a diagram illustrating a method for neutralizing cyber-based threats in accordance with example embodiments.

FIG. 4 illustrates a method 400 for neutralizing cyber-based threats in accordance with example embodiments. For example, the method 400 may be performed by the neutralizer 230 shown in FIG. 2. Referring to FIG. 4, in 410 the method includes receiving input signals from an asset including time series data associated with the asset and transforming the input signals into feature values in a feature space. The asset may be a physical asset such as machinery or equipment in the field of healthcare, industry, manufacturing, transportation, energy, etc. The input signals may include signals related to a physical asset included within an Industrial Internet of Things (IIoT). Examples of input signals include measured parameters from the asset, control signals, reference signals, and the like. In response to receiving the input signals, the method may transform the input signals from the time domain into the frequency domain. For example, the input signals may be transformed into frequency values such as frequency vectors. The feature vectors may have at least two dimensions (e.g., magnitude, location, time, etc.) and be graphed in a multi-dimensional feature space.

In 420, the method includes detecting one or more abnormal feature values in the feature space based on a predetermined normalcy boundary associated with the asset. The normalcy boundary may be determined based on historical data (i.e., normal and/or abnormal) data previously received from the asset. In some embodiments, the normalcy boundary may be continually updated based on newly received sensor data from the asset. The abnormal values may be identified based on the position of feature vector in the feature space with respect to the normalcy boundary, also referred to as an attack boundary. In this case, the values plotted inside the boundary may be determined as normal while the values plotted outside the boundary may be determined as abnormal or threats. Here, the detected abnormal feature values may correspond to an attack signal associated with the asset.

In 430, the method includes determining estimated true feature values (i.e., true feature vector) for each abnormal feature value (i.e., abnormal feature vector). For example, an estimated true feature values in a true feature vector may be determined by masking a portion of the feature vector associated with an attack signal such that the resulting feature vector with feature values is located within the predetermined normalcy boundary in the feature space. In this example, the true feature vector may be an estimate of the true features of normal signal with the attack signal removed. In some examples, prior to determining the true value for a feature vector, the method may include determining that an observability condition (Not shown in Figures) associated with the feature space is satisfied prior to estimating the true value. Examples of estimating the true value in the true feature vector are described with reference to FIGS. 2 and 3. In 440, the method includes performing an inverse transform of each estimated true feature vector to generate neutralized signals comprising time series data and outputting the neutralized signals, in 450. For example, the neutralized signals may be output to a control system or another device associated with the asset.

Figure 5:
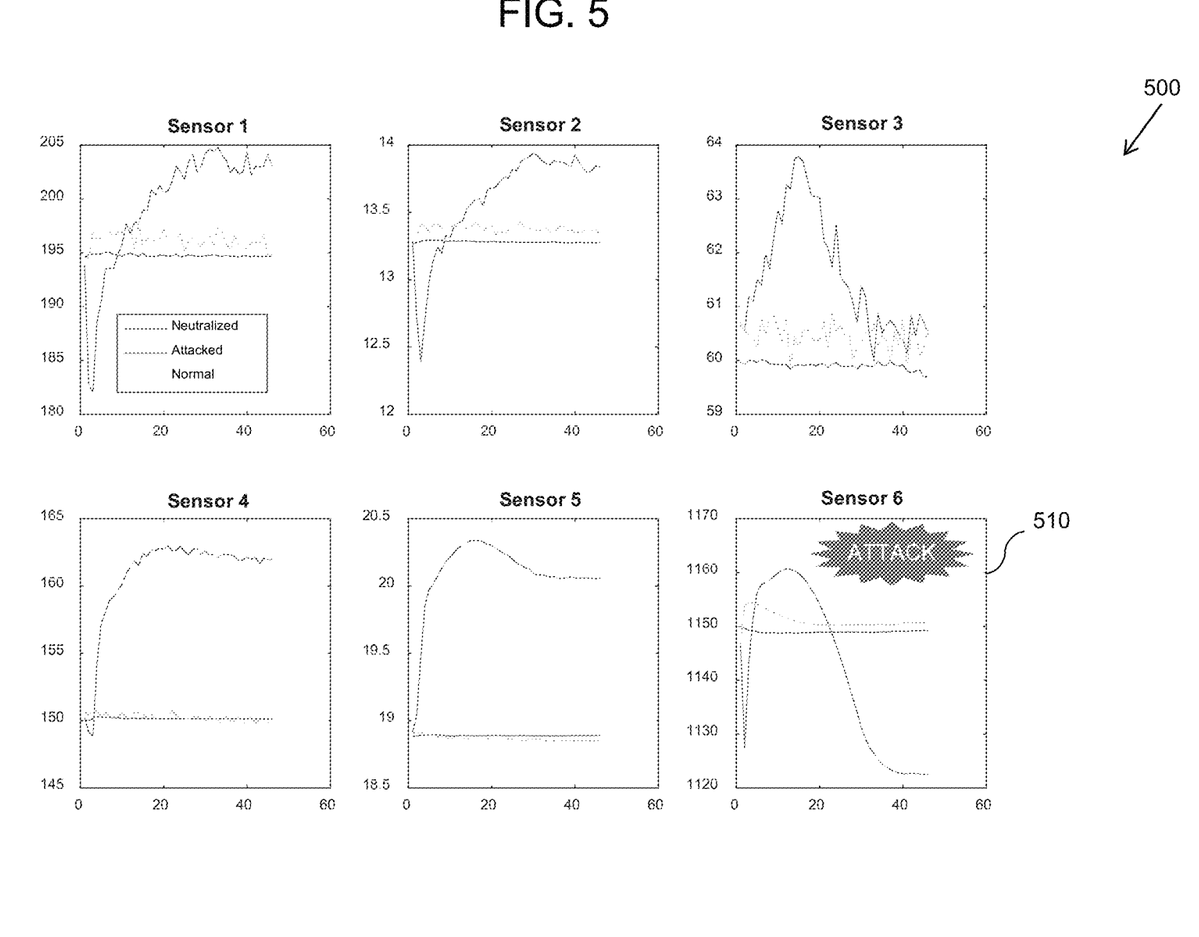
FIG. 5 is a diagram illustrating an example of a simulated performance of a boundary and performance constrained resilient estimator in accordance with an example embodiment

FIG. 5 illustrates an example 500 of the simulated performance of a boundary and performance constrained resilient estimator as described above. In this example, 45 seconds of a time series signal is shown for six sensor nodes (sensors 1 to 6). The top (red) signal corresponds to output of sensors during an attack when sensor 510 was subjected to a bias attack. The middle (green) signal of each graph corresponds to the normal operational condition prior to the attack while the bottom (blue) signal of each graph corresponds to neutralized signals obtained after processing through techniques described in the example embodiments.

For this example simulation, the system identification in the feature space described by Equation 2 is not used. After performing optimization true global feature vectors are obtained. They were then transformed to time series using inverse feature transform. Clearly, FIG. 5 shows, neutralized signals generated by BPRE algorithm are inside the attack boundary and is very close to the operational normalcy. FIG. 5 illustrates an example of results of the BPRE algorithm in the presence of a sensor attack.

Figure 6:
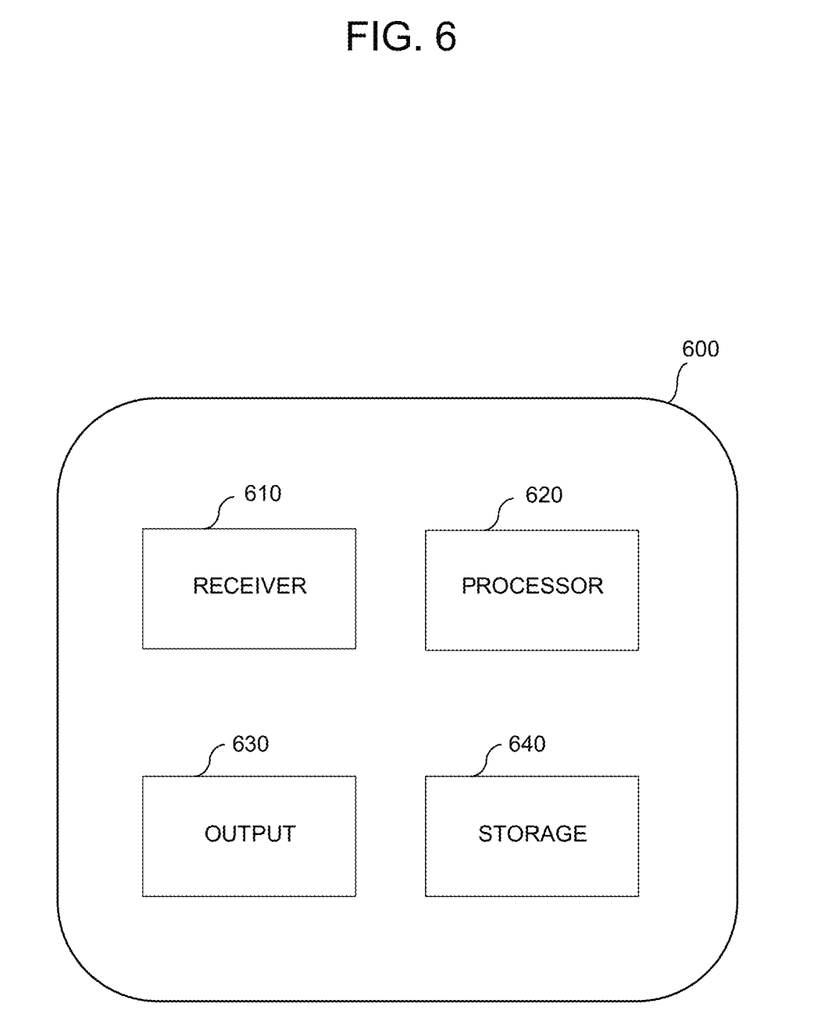
FIG. 6 is a diagram illustrating a computing device for neutralizing cyber-based threats in accordance with an example embodiment.

FIG. 6 illustrates a computing device 600 for neutralizing cyber-based threats in accordance with an example embodiment. For example, the computing device 600 may correspond to the neutralizer 230 shown in FIG. 2, or another device. In some cases, the computing device 600 may be implemented within a control system, a cloud environment, and/or the like. Also, the computing device 600 may perform the method 400 of FIG. 4. Referring to FIG. 6, the computing device 600 includes a receiver 610, a processor 620, an output 630, and a storage device 640. Although not shown in FIG. 6, the device 600 may include other components such as a display, an input unit, and the like. The receiver 610 and the output 630 may include a signal receiver/transmitter, a transceiver, a network interface, and the like, and may transmit and receive data over a network such as the Internet, a private network, a public network, and the like, and may transmit and receive data via a wired connection. The receiver 610 and the transmitter 630 may be a wireless communicator, a wired communicator, or a combination thereof. The processor 620 may include one or more processing devices each including one or more processing cores. In some examples, the processor 620 is a multicore processor or a plurality of multicore processors. Also, the processor 620 may be fixed or it may be reconfigurable. The storage device 640 is not limited to any particular storage device and may include any known memory device such as RAM, ROM, hard disk, and the like.

According to various embodiments, the receiver 610 may receive input signals from an asset comprising time series data associated with the asset. The input signals may include time series data sensed by sensors associated with an Industrial Internet of Things (IIoT). For example, the asset may be a physical asset such as a wind turbine, a gas turbine, an oil rig, mining equipment, an aircraft, a locomotive, a manufacturing system, a healthcare system, a chemical processing system, and the like. The time series data may be sensed by one or more sensors attached to or fixed about the asset. As another example, the time series data may include virtual data sensed from a digital twin representing the physical asset in virtual space. Examples of time series data include sensed minimums, maximums, ranges, magnitudes, direction, location, and the like. The processor 620 may transform the input signals into feature values in a feature space. For example, the processor 620 may convert the time series signals in a time domain into feature vectors in a feature domain. The feature vectors may represent multiple features of an object using a multi-dimensional vector. In some embodiments, the feature vector includes two dimensions, but is not limited thereto.

The processor 620 may detect one or more abnormal feature values in the feature space based on a predetermined normalcy boundary associated with the asset. For example, the processor 620 may define a normalcy boundary based on historical data received from the asset. The normalcy boundary may be generated based on a typical value or pattern of the input signal from the asset that is received. In some embodiments, the processor 620 may update the normalcy boundary based on currently sensed data associated with the asset. Accordingly, the computing device 600 may correspond to an intelligent system that continues to learn from incoming sensor data.

The abnormal feature values may be feature vectors that fall outside of the normalcy boundary. In other words, the abnormal feature values may have values that correspond to the normal behavior pattern previously established for the input signals. In this example, the processor 620 may determine that the abnormal feature values correspond to an attack or a threat that has infiltrated the asset. In order to neutralize the attack, the processor 620 may determine an estimated true value for each abnormal feature value. For example, the processor 620 may determine an estimated true value for a feature value by masking a portion of the feature value associated with an attack signal such that the resulting feature value is located within the predetermined normalcy boundary in the feature space. In some embodiments, the processor 620 may further determine that an observability condition associated with the abnormal feature values is satisfied prior to estimating the true value for the abnormal feature values. The processor 620 may perform an inverse transform of each estimated true value to generate neutralized signals comprising time series data and control the output 630 to output the neutralized signals to a device or software such as a control system, a cloud, another component, and the like.

The example embodiments are aimed at going beyond detecting attacks/anomalies. The threat neutralizer described herein provides an automated accommodation when cyber disruptions, such as stealthy attacks occur to an industrial system. Attacks have become very sophisticated. According to cybersecurity experts of control systems, sophisticated malware and viruses may sitting inside the industrial control system software remained undetected for as many as 443 days in 2016, whereas the same for IT systems 146 days in 2015. They are challenging to detect because they are multi-prong and current fault detection systems are unable to find them. Also, fault detection systems do not estimate true states for operational normalcy. The boundary and performance constrained resilient estimator included within the threat neutralizer is able to automatically find true estimates of signals and hence provide adjustments to system operations in response to ongoing attacks while maintaining the operations expected for performance. The threat neutralizer is able to self-detect attacks and then nullify the attack signatures by finding true value of signals, mechanistically the same way as human immune system does to destroy pathogens. Thus, learning from the human body is accomplished here.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, semiconductor memory such as read-only memory (ROM), and/or any transmitting/receiving medium such as the Internet, cloud storage, the internet of things, or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor, and may be implemented in a high-level procedural and/or object-oriented programming language, and/or in assembly/machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

What is claimed is:

1. A method comprising:
   receiving, from a plurality of sensors, time-series input signals comprising time series sensor data that is measured of an industrial operation of an industrial asset and transforming the time series sensor data into feature values in a feature space;
   detecting an abnormal feature value among the transformed feature values in the feature space based on a position of the abnormal feature value with respect to predetermined normalcy boundary line integrated within the feature space, wherein the normalcy boundary line identifies abnormal feature values corresponding to abnormal transformed time series sensor readings measured by one or more sensors;
   converting the abnormal feature value from the transformed time-series input signals into a normal feature value within the predetermined normalcy boundary representing a true estimate of a time-series input signal of the abnormal feature value by masking a portion of, but not all of, the abnormal feature value to generate neutralized signals; and
   outputting the neutralized signals to a computing device associated with the industrial asset while the industrial asset remains powered on.

2. The method of claim 1, wherein the transforming comprises transforming one or more of speed, weight, force, acceleration, and thrust, measured from the operation of the industrial asset into data points in feature space.

3. The method of claim 1, wherein the transforming comprises transforming the time series sensor data from the industrial asset into feature vectors.

4. The method of claim 1, wherein the transforming the time series sensor data into feature values is based on an identity transform.

5. The method of claim 1, further comprising determining the normalcy boundary line in the feature space based on one or more of a historical sensor data measured from the industrial asset, and a data set obtained from input-output design of experiments on a digital twin of the industrial asset.

6. The method of claim 5, further comprising updating the normalcy boundary line based on currently sensed sensor data measured from the industrial asset.

7. The method of claim 1, wherein the detected abnormal feature value corresponds to a time-series attack signal associated with the industrial asset.

8. The method of claim 1, wherein the time-series input signals are received from a computing device of the industrial asset and the neutralized signals are output to a control system that controls industrial operation of the industrial asset.

9. The method of claim 1, wherein the outputting comprises transforming the converted abnormal feature value into the true-estimate of the time-series input signal, and outputting the true-estimate of the time-series input signal to the computing device.

10. A computing system comprising:
    a receiver configured to receive, from a plurality of sensors, time-series input signals comprising time series sensor data that is measured of an industrial operation of an industrial asset;
    a processor configured to
      transform the time series sensor data into feature values in a feature space,
      detect an abnormal feature among the transformed feature values in the feature space based on a position of the feature value with respect to a predetermined normalcy boundary line integrated within the features space, wherein the normalcy boundary line identifies abnormal feature values corresponding to abnormal transformed time series sensor readings measured by one or more sensors, and convert the abnormal feature value from the transformed time-series input signals into a normal feature value within the predetermined normalcy boundary representing a true estimate of a time-series input signal of the abnormal feature value by masking a portion of, but not all of, the abnormal feature value to generate neutralized signals; and an output configured to output the neutralized signals to a computing device associated with the industrial asset while the industrial asset remains powered on.

11. The computing system of claim 10, wherein the processor transforms one or more of speed, weight, force, acceleration, and thrust, measured from the operation of the industrial asset into data points in feature space.

12. The computing system of claim 10, wherein the processor is configured to transform the time series sensor data from the industrial asset into feature vectors.

13. The computing system of claim 10, wherein the processor transforms the timer series sensor data into feature values based on an identity transform.

14. The computing system of claim 10, wherein the processor is further configured to determine the normalcy boundary line in the feature space based on one or more of a historical sensor data measured from the industrial asset, and a data set obtained from input-output design of experiments on a digital twin of the industrial asset.

15. The computing system of claim 14, wherein the processor is further configured to update the normalcy boundary line based on currently sensed data associated with the industrial asset.

16. The computing system of claim 10, wherein the detected abnormal feature value corresponds to a time-series attack signal associated with the industrial asset.

17. The computing system of claim 10, wherein the receiver receives the time-series input signals from a computing system of the industrial asset and the output outputs the neutralized signals to a control system for controlling operations of the industrial asset.

18. A non-transitory computer readable storage medium having stored therein instructions that when executed cause a processor to perform a method comprising:

receiving, from a plurality of sensors, time-series input signals comprising time series sensor data that is measured of an industrial operation of an industrial asset and transforming the time series sensor data into feature values in a feature space;

detecting an abnormal feature value among the transformed feature values in the feature space based on a position of the abnormal feature value with respect to predetermined normalcy boundary line integrated within the feature space, wherein the normalcy boundary line identifies abnormal feature values corresponding to abnormal transformed time series sensor readings measured by one or more sensors;

converting the abnormal feature value from the transformed time-series input signals into a normal feature value within the predetermined normalcy boundary representing a true estimate of a time-series input signal of the abnormal feature value by masking a portion of, but not all of, the abnormal feature value to generate neutralized signals; and outputting the neutralized signals to a computing device associated with the industrial asset while the industrial asset remains powered on.

19. The method of claim 1, wherein the feature space comprises two or more axes corresponding to two or more features, respectively, and the predetermined normalcy boundary line comprises a multi-dimensional line which separates normal feature values and abnormal feature values for the two or more features when plotted.

* * * * *